Oct. 6, 1953     E. R. PRICE     2,654,391
SERVOMOTOR CONTROL VALVE
Original Filed March 22, 1943     2 Sheets-Sheet 1
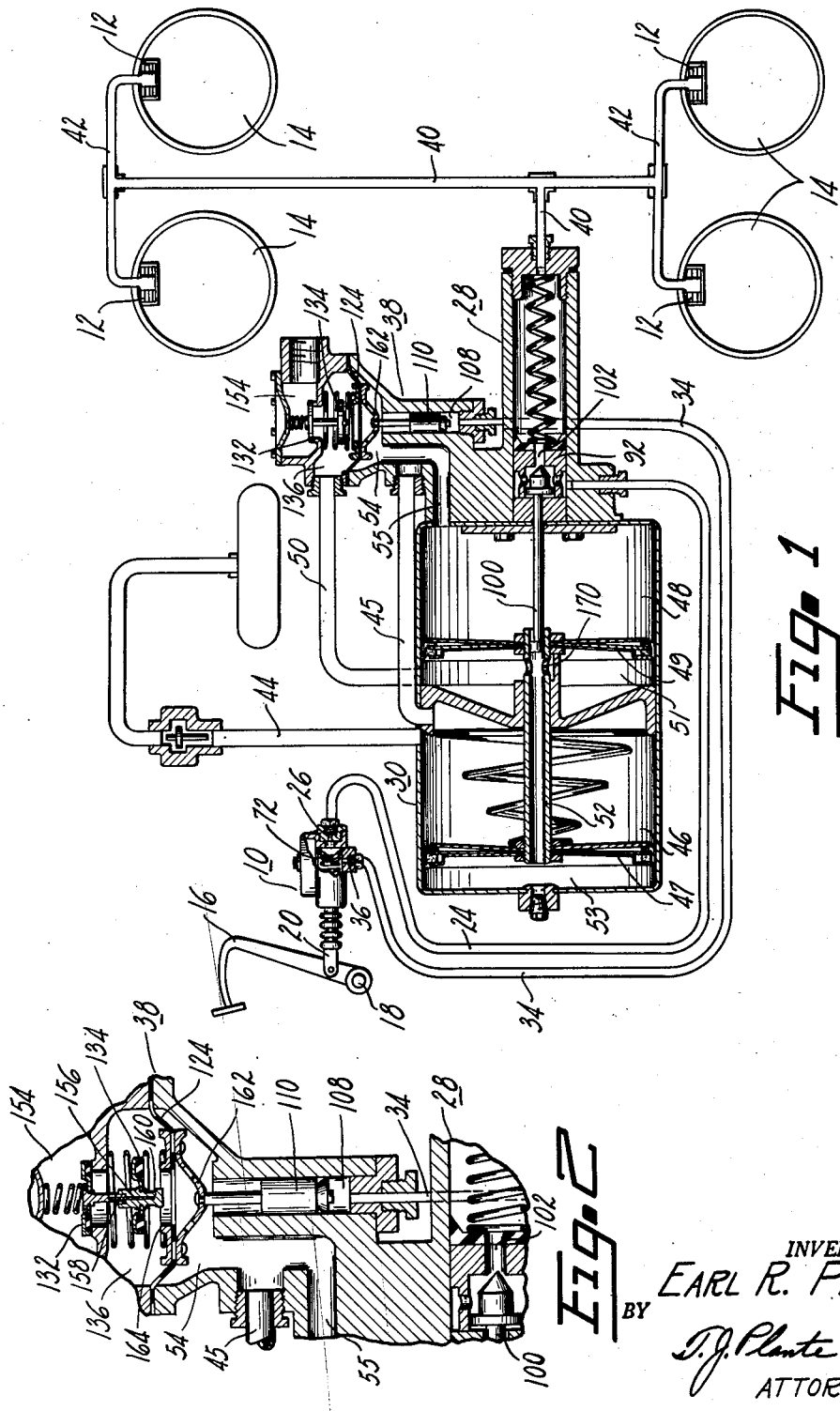
INVENTOR.
EARL R. PRICE
BY
T. J. Plante
ATTORNEY

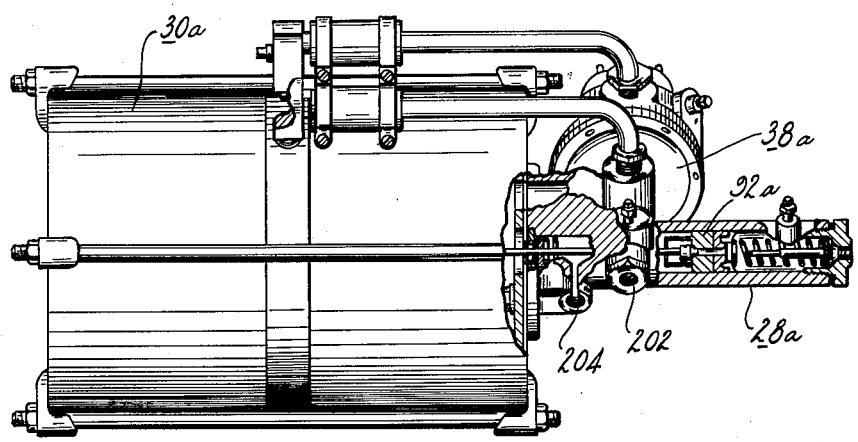
Fig. 3
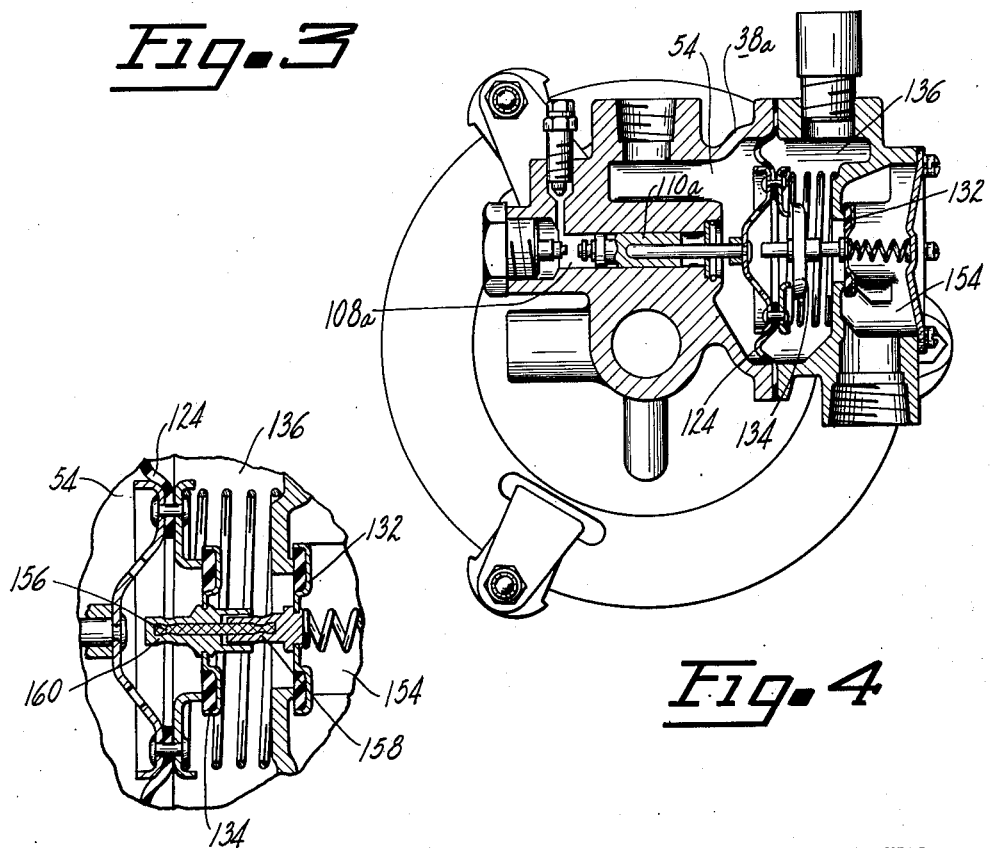
Fig. 4
Fig. 5
INVENTOR.
EARL R. PRICE
BY
T. J. Plante
ATTORNEY Patented Oct. 6, 1953

2,654,391

UNITED STATES PATENT OFFICE 2,654,391

SERVOMOTOR CONTROL VALVE

Earl R. Price, South Bend, Ind., assignor to Bendix Aviation Corporation, South Bend, Ind., a corporation of Delaware Original application March 22, 1943, Serial No. 479,974, now Patent No. 2,446,884, dated August 10, 1948. Divided and this application May 29, 1947, Serial No. 751,283

8 Claims. (Cl. 137—620)

This invention relates to a servo-motor control valve, particularly intended to operate a differential air pressure power cylinder. The present application is a division of Price application Serial No. 479,974, filed March 22, 1943, now Patent No. 2,446,884, issued August 10, 1948.

In general, it is the object of the present invention to provide a simplified and more efficient control valve, which will constitute an improvement over the control valve, for example, of Johnson Patent No. 2,111,322.

The present control valve is considered to constitute an improvement over that disclosed in the Johnson patent in at least the following respects:

(a) It provides a simpler and less expensive construction by eliminating the floating control lever of the patented valve;

(b) It increases efficiency of the valve by utilizing a flexible shaft, or rod, to interconnect two aligned poppets, thereby permitting the poppets to be self-aligning in lapped position;

(c) It limits the aforementioned flexibility to the lateral direction only, avoiding flexibility, or "give", in the longitudinal direction; and (d) It obtains the foregoing advantages without necessitating larger port openings, as is the case with a "single poppet" arrangement, in which the valve element for one port constitutes the valve seat for the other port.

Other objects and advantages of the present invention will become apparent during the following description, reference being had therein to the accompanying drawings, in which:

Figure 1 is a view, partly diagrammatic and partly sectional, of a power braking system which utilizes my improved control valve;

Figure 2 is a closeup of the valve shown in Figure 1;

Figure 3 is a view, partly in side elevation and partly in section, showing the commercial embodiment of the power braking system of Figure 1;

Figure 4 is an enlarged section taken through the control valve of Figure 3; and Figure 5 is an enlarged section taken through the poppet valve arrangement of Figure 4.

In order to explain fully the function of my improved control valve, a complete power braking system has been illustrated. As shown in Figure 1, the braking system includes a master cylinder 10 adapted to put liquid under pressure, and a plurality of conventional wheel cylinders 12 adapted to actuate the brakes, which are diagrammatically illustrated at 14. A manually operable pedal 16, pivoted at 18, has a rod 20 extending into the interior of the master cylinder 10 and engaging the piston therein (not shown), said rod and piston being arranged to put the liquid in the master cylinder under pressure in response to manual actuation of the pedal 16. A liquid-carrying conduit 24 is connected to master cylinder 10 at master cylinder outlet 26, and said conduit 24 connects the master cylinder to an auxiliary master cylinder 28. A separate conduit 34 connects outlet port 36 of master cylinder 10 to a control or relay valve indicated generally at 38. It will be noted that a residual pressure check valve 72 is positioned inside the master cylinder 10, and is located between outlet 26 and outlet 36, the arrangement being such that the liquid in conduit 24 is under residual pressure, whereas the liquid in conduit 34 is under reservoir pressure only. The reasons for this arrangement are explained at length in Patent No. 2,446,884.

Adjacent to, and associated with, the auxiliary master cylinder 28 is a pneumatic or vacuum power cylinder 30. The outlet end of the auxiliary cylinder 28, i. e., the end farthest from the power cylinder 30, is connected by a liquid-carrying conduit 40 and branches 42 thereof to the wheel cylinders 12.

A pneumatic or vacuum carrying line 44, extending from a source of vacuum, as for example, the usual intake manifold, is connected to chamber 46 of power cylinder 30. Another vacuum line 45 connects constant vacuum chamber 46 with chamber 54 of control valve 38, and, through passage 55, with chamber 48 of the power cylinder. Chambers 46 and 48 are at the right side of the respective tandem pistons 47 and 49, which reciprocate in the power cylinder. A pipe 50 connects the control chamber of control valve 38 to chambers 51 and 53 of the power cylinder, the latter chamber being interconnected with chamber 51 through the tubular connecting rod 52.

The auxiliary cylinder 28 has a piston 92 reciprocable therein between the point where conduit 24 is connected to the cylinder and the forward end of the cylinder, which is connected by conduit 40 to the brakes. When pressure is applied by pedal 16 to the fluid in master cylinder 10, the fluid will be forced through conduit 24 and cylinder 28 to apply the brakes. As soon as a pressure sufficient to overcome the spring in control valve 38 has been developed, said valve will actuate the power cylinder by creating a pressure differential over the tandem pistons 47 and 49, and the pistons will exert force through a rod 100 to move piston 92 in cylinder 28, at the same time cutting off passage 102 through piston 92 to prevent direct fluid communication between conduits 24 and 40.

Referring in detail to the construction of my improved control valve 38, which is shown enlarged in Figure 2, the floating poppet assembly includes a pair of flexibly connected poppets 132 and 134, the poppet 132 being adapted to control the admission of air to control chamber 136, and poppet 134 being adapted to control the evacuation of air from said chamber. The chamber 136 is connected by means of control line 50 with the power cylinder, in order that the pressure prevailing in chamber 136 will also prevail at the rear of each of the tandem pistons in the power cylinder. Chamber 54 of the valve is continuously connected to a source of vacuum by conduit 45 which connects to chamber 46 of the power cylinder. Chamber 154 of the valve is connected directly to the atmosphere.

The poppets 132 and 134 are so connected that they move as a unit in the axial direction but they are capable of a slight relative lateral movement in order that they may both be properly aligned with their seats, thus preventing leakage. The poppets are connected by means of a flexible cable 156, which permits the necessary movement of the poppets to align themselves with their seats. In order that the structure will have sufficient strength to operate properly, the flexible cable 156 is encased in a pair of telescoping sleeves 158 and 160, each of which is connected to one of the poppets, and each of which is pinched slightly to retain one end of the cable. A slight radial clearance is provided between the two sleeves, in order that lateral flexing of the cable will be permitted.

As liquid under pressure is forced into chamber 108, piston 110 is moved upwardly, moving the yoke 162 and diaphragm 124. This movement brings the valve seat 164 into contact with poppet 134 cutting off chamber 136 from the vacuum source. Further movement upward of the piston and diaphragm, acting through the connection between the two poppets, pushes poppet 132 from its seat, allowing air at atmospheric pressure to enter chamber 136. The air flowing through conduit 50, enters chamber 51 at the rear of piston 49 in the power cylinder. This air likewise flows through the openings 170 and the hollow piston rod 52 to chamber 53 at the rear of piston 47. Since chambers 46 and 48, which are in front of the respective pistons, are connected to the vacuum source, the air entering chambers 51 and 53 simultaneously urges both pistons forward to create pressure in the master cylinder 29. Use of the tandem pistons 47 and 49 makes it possible to build up power equivalent to that which would be developed over a single piston twice the size of either of the tandem pistons.

When the reaction pressure of diaphragm 124, i. e., the pressure of the air in chamber 136 against the vacuum in chamber 54, has built up sufficiently, the diaphragm will move downwardly permitting the valve to return to lapped position, in which both the vacuum and the atmosphere ports are closed.

In Figure 3, a compact working embodiment of the invention is shown. The control valve 38a and the auxiliary master cylinder 29a are mounted on the forward end of power cylinder 30a, the control valve being located at one side of the auxiliary master cylinder, as shown. The port 202 which leads to chamber 108a of the control valve is connected to conduit 34, and port 204 which opens into the chamber at the rear of piston 92a in the auxiliary master cylinder is connected to conduit 24.

Figure 4 shows a cross-section of the control valve 38a, and Figure 5 shows a closeup of the floating poppet device. As described above, the poppets 132 and 134 are flexibly connected by means of a cable 156, which is encased in the telescoping sleeves 158 and 160, a radial clearance being allowed between the sleeves in order to permit relative lateral movement of the poppets to align themselves with their respective seats.

In the valve device of Figures 4 and 5, the chamber 154 is directly connected to atmosphere, the chamber 136 is connected to the power cylinder to operate the same, and the chamber 54 is connected to the vacuum source. It will therefore be apparent that the operation of this valve corresponds to the operation of the valve shown in Figures 1 and 2, and described above.

Although certain particular embodiments of my invention have been described, it will be understood by those skilled in the art that the object of the invention may be attained by the use of constructions different in certain respects from those disclosed without departing from the underlying principles of the invention. I therefore desire by the following claims to include within the scope of my invention all such variations and modifications by which substantially the results of my invention may be obtained through the use of substantially the same or equivalent means.

I claim:

1. A valve for controlling the operation of a differential air pressure power device comprising a casing, a diaphragm having a first valve opening and dividing the interior of said casing into two variable volume chambers, said casing having a second valve opening which communicates with one of said chambers, a first resilient member arranged to urge said diaphragm away from said second opening, a first valve element for controlling said first opening, a second valve element for controlling said second opening, said valve elements being coupled together by means of a flexible connection which holds said elements against movement toward or away from each other, and a second resilient member arranged to act on said second valve element to close said second opening, said diaphragm being movable to close said first opening by seating it against said first valve element.

2. A valve for controlling the operation of a differential air pressure power device comprising a casing, a diaphragm having a first valve opening providing a valve seat and dividing the interior of said casing into two variable volume chambers, said casing having a second valve opening which communicates with one of said chambers, a first valve element for controlling said first opening, and a second valve element for controlling said second opening, said valve elements being coupled together by means of a flexible connection which holds said elements against movement toward or away from each other, said diaphragm being movable to close said first opening by seating it against said first valve element.

3. In a valve having a pair of spaced substantially aligned ports, a pair of spaced substantially axially aligned valve elements, and means connecting said valve elements for moving them axially as a unit simultaneously but permitting slight relative lateral movement of the valve elements to obtain proper alignment of each valve element with its seat, said connection comprising a cable attached to each valve element and a pair of telescoping slightly radially spaced sleeves around said cable, each sleeve being supported by a corresponding one of said valve elements.

4. In a valve having a pair of spaced substantially aligned ports, a pair of spaced substantially axially aligned valve elements and a connection between said elements, said connection comprising a hollow tubular element secured to one of said elements, a boss secured to the other of said elements and enterable into the bore of said tubular element, and a non-resilient flexible member effectively secured at its ends to said valve elements, the diameters of said bore and said boss being of such respective sizes as to provide for lateral relative movement therebetween, said non-resilient flexible member preventing oppositely directed movements of said valve elements.

5. In a valve having a pair of spaced substantially aligned ports, a pair of spaced substantially axially aligned poppets for controlling said ports, and means connecting said poppets for substantially simultaneous movement in an axial direction but permitting slight relative lateral movement of the poppets to obtain proper alignment of each poppet with its seat, said connection comprising a cable attached to each poppet and a pair of telescoping slightly radially spaced sleeves around said cable, each sleeve being supported by a corresponding one of said poppets.

6. In a valve having a pair of spaced substantially aligned ports, a pair of spaced substantially axially aligned poppets, and means connecting said poppets for substantially simultaneous movement in an axial direction but permitting slight relative lateral movement of the poppets to obtain proper alignment of each poppet with its seat, said connection comprising a cable attached to each poppet and a sleeve around said cable at one extremity thereof and supported by one of said poppets.

7. In a valve having a pair of spaced substantially aligned ports, a pair of spaced substantially axially aligned valve members, and a connection between said members, said connection comprising a hollow tubular element secured to one of said members, a boss secured to the other of said member enterable into the bore of tubular element, and a non-resilient flexible member having its one extremity disposed interiorly of and secured to said tubular element, said non-resilient flexible member having its opposite extremity secured to said boss, the diameters of said bore and said boss being of such respective sizes as to provide for relative lateral movement therebetween, said non-resilient flexible member preventing oppositely directed movements of said valves while at the same time permitting such relative lateral movement.

8. In a valve having a pair of spaced substantially aligned ports, a pair of spaced substantially axially aligned valve members for controlling said ports, and a connection between said valve members comprising an elongated bendable element attached to each poppet and a pair of telescoping slightly radially spaced sleeves through which said element projects, each sleeve being supported by a corresponding one of said valve members, said element permitting slight relative lateral movement of the valve members to obtain proper alignment of each valve member with its seat while at the same time causing said valve members to move in an axial direction substantially simultaneously.

EARL R. PRICE.

References Cited in the file of this patent

UNITED STATES PATENTS

| Number | Name | Date |
|---|---|---|
| 588,458 | Matton | Aug. 17, 1897 |
| 640,222 | Price | Jan. 2, 1900 |
| 1,848,413 | Bragg | Mar. 8, 1932 |
| 2,240,163 | Pick | Apr. 29, 1941 |
| 2,259,809 | Freeman | Oct. 21, 1941 |
| 2,274,308 | Tschanz | Feb. 24, 1942 |
| 2,345,223 | Upp | Mar. 28, 1944 |
| 2,416,091 | Fitch | Feb. 18, 1946 |
| 2,429,196 | Price | Oct. 14, 1947 |

FOREIGN PATENTS

| Number | Country | Date |
|---|---|---|
| 461,488 | Germany | of 1929 |